United States Patent
Sullivan et al.

[11] Patent Number: 5,857,926
[45] Date of Patent: Jan. 12, 1999

[54] GOLF BALL COVER FORMED FROM BLEND OF IONOMER, ACID COPOLYMER AND ETHYLENE-PROPYLENE RUBBER, AND METHOD OF MAKING SAME

[75] Inventors: Michael J. Sullivan, Chicopee, Mass.; Edward J. Kaltenbacher, Houston, Tex.

[73] Assignee: Lisco, Inc., Tampa, Fla.

[21] Appl. No.: 876,150

[22] Filed: Jun. 13, 1997

[51] Int. Cl.$^6$ .................................................. C08L 67/02
[52] U.S. Cl. .................. 473/378; 473/374; 473/377; 473/385; 273/DIG. 22; 525/165
[58] Field of Search ........................ 525/165; 473/374, 473/377, 378, 385; 273/DIG. 22

[56] References Cited

U.S. PATENT DOCUMENTS

| | | | |
|---|---|---|---|
| 3,384,612 | 5/1968 | Brandt et al. | 260/41 |
| 3,410,928 | 11/1968 | Baum | 260/897 |
| 3,454,676 | 7/1969 | Busse | 260/897 |
| 4,307,204 | 12/1981 | Vidal | 521/140 |
| 4,373,066 | 2/1983 | Karim et al. | 525/133 |
| 4,376,845 | 3/1983 | Metzger | 525/196 |
| 4,884,814 | 12/1989 | Sullivan | 473/385 |
| 4,986,545 | 1/1991 | Sullivan | 273/235 R |
| 5,098,105 | 3/1992 | Sullivan | 273/235 R |
| 5,281,651 | 1/1994 | Arjunan et al. | 524/519 |
| 5,312,857 | 5/1994 | Sullivan | 473/378 |
| 5,321,089 | 6/1994 | Cadorniga et al. | 525/196 |
| 5,330,837 | 7/1994 | Sullivan | 473/385 |
| 5,338,610 | 8/1994 | Sullivan | 428/407 |
| 5,359,000 | 10/1994 | Hamada et al. | 473/385 |
| 5,397,840 | 3/1995 | Sullivan et al. | 525/221 |
| 5,407,998 | 4/1995 | Horiuchi et al. | 473/385 |
| 5,480,155 | 1/1996 | Molitor et al. | 473/385 |
| 5,580,057 | 12/1996 | Sullivan et al. | 273/DIG. 22 |
| 5,688,869 | 11/1997 | Sullivan | 525/196 |
| 5,703,166 | 12/1997 | Rajagopalan et al. | 473/385 |

*Primary Examiner*—Randy Gulakowski

[57] ABSTRACT

Disclosed herein is a golf ball cover composition comprising a combination of ionomer, ethylene-propylene rubber, and copolymer formed from (a) an $\alpha$-olefin having two to eight carbon atoms, (b) an unsaturated monomer of the acrylate ester class having from 1–21 carbon atoms, and (c) an acid which includes at least one member selected from the group consisting of $\alpha$, $\beta$-ethylenically unsaturated mono- and dicarboxylic acids, the weight ratio of the ethylene-propylene rubber to copolymer of $\alpha$-olefin, acrylate ester and acid being in the range of 25:75 to 75:25. The novel cover composition enables the production of a golf ball having a high coefficient of restitution and a very soft cover with excellent cut resistance.

28 Claims, No Drawings

GOLF BALL COVER FORMED FROM BLEND OF IONOMER, ACID COPOLYMER AND ETHYLENE-PROPYLENE RUBBER, AND METHOD OF MAKING SAME

FIELD OF THE INVENTION

The present invention generally relates to golf balls, and more particularly to golf ball cover compositions.

BACKGROUND OF THE INVENTION

Ionomeric resins are polymers containing interchain ionic bonding. Ionomeric resins are generally partially neutralized copolymers of an olefin such as ethylene and an unsaturated carboxylic acid, such as acrylic acid, methacrylic acid, or maleic acid. Metal ions, such as sodium, zinc, lithium or magnesium are used to neutralize some portion of the acidic groups in the copolymer resulting in a thermoplastic elastomer exhibiting enhanced properties, i.e. durability, etc. for golf ball cover construction versus balata. As a result of their toughness, durability, and flight characteristics, various ionomeric resins sold either by Exxon Corporation under the trademark "Iotek®" or by E.I. DuPont de Nemours & Company under the trademark "Surlyn®", have become the materials of choice for the construction of golf ball covers over the traditional "balata"(trans polyisoprene, natural or synthetic) rubbers. The softer balata covers, although exhibiting enhanced playability properties, lack the durability necessary for repetitive play.

Golf ball covers made from soft ionomeric resins are, in many cases, prone to cutting and scuffing. It would be useful to provide a soft ionomer-containing golf ball cover with excellent cut resistance.

SUMMARY OF THE INVENTION

An object of the invention is to provide a golf ball cover having a combination of softness and a high coefficient of restitution.

Another object of the invention is to provide a golf ball cover having a combination of softness and good cut resistance.

A further object of the invention is to provide a golf ball having a high spin rate in combination with good cut resistance.

Yet another object of the invention is to provide a golf ball cover containing reduced quantities of ionomer.

A further object of the invention is to provide a method for making a golf ball having the type of cover described above.

Other objects will be in part obvious and in part pointed out more in detail hereafter.

The invention in a preferred form is a golf ball having a cover layer with a composition comprising a combination of (1) ionomeric copolymer, (2) ethylene- propylene rubber, and (3) copolymer formed from (a) an olefin having two to eight carbon atoms, (b) an unsaturated monomer of the acrylate ester class having from 1–21 carbon atoms, and (c) an acid which includes at least one member selected from the group consisting of $\alpha$, $\beta$-ethylenically unsaturated mono- and dicarboxylic acids, the weight ratio of the ethylene-propylene rubber (2) to copolymer (3) being in the range of 25:75 to 75:25. The combination preferably includes at least 10 weight % ionomeric copolymer (1) based upon the overall weight of the cover material. In a particularly preferred form of the invention, the combination includes at least 20 weight % ionomeric copolymer (1). Superior results are achieved when the composition has at least 40 weight % ionomeric copolymer (1).

The ethylene-propylene rubber (2) preferably is a terpolymer elastomer made from ethylene, propylene and diene monomer, the elastomer being known as a polymer formed from ethylene propylene diene monomer (EPDM). Preferably the copolymer (3) is substantially unneutralized.

It is preferred that the ethylene-propylene rubber (2) and copolymer formed from olefin, acrylate ester and acid (3) are present in a weight ratio in the range of 40:60 to 60:40. The cover layer preferably has a Shore C hardness of 65–95 and more preferably 75–95. The combination preferably constitutes at least 85 wt %, and more preferably at least 90 wt % of the overall cover composition.

Another preferred form of the invention is a golf ball having a cover layer with a composition comprising a combination of (a) ionomeric copolymer, (b) ethylene-propylene rubber, and (c) substantially unneutralized terpolymer, the ethylene-propylene rubber (b) and terpolymer (c) being combined in a weight ratio of 40:60 to 60:40. The ratio of the sum of the weights of ethylene-propylene rubber (b) and terpolymer (c) to the weight of ionomeric copolymer (a) in the combination is in the range of 20:80 to 80:20. The terpolymer (c) is formed from ethylene, an acid which includes at least one member selected from the group consisting of acrylic, maleic, itaconic, fumaric, and methacrylic acids, and half esters of maleic, fumaric, and itaconic acids, and an unsaturated monomer of the acrylate ester class including at least one member selected from the group consisting of methyl-, ethyl-, n-propyl-, n-butyl-, n-octyl-, 2-ethylhexyl-, and 2-methoxyethyl-1-acrylates. The terpolymer preferably is unneutralized.

Yet another preferred form of the invention is a method of making a golf ball comprising the steps of providing a golf ball core and forming a cover layer over the core, the cover layer having a composition comprising a combination of (i) ionomeric copolymer, (ii) ethylene-propylene rubber, and (iii) substantially unneutralized copolymer formed from (a) an $\alpha$-olefin having two to eight carbon atoms, (b) an unsaturated monomer of the acrylate ester class having from 1–21 carbon atoms, and (c) an acid which includes at least one member selected from the group consisting of $\alpha$, $\beta$-ethylenically unsaturated mono- or dicarboxylic acids, the weight ratio of the ethylene-propylene rubber (ii) to copolymer of olefin, acrylate ester, and acid (iii) being in the range of 25:75 to 75:25.

The invention accordingly comprises the several steps and the relation of one or more of such steps with respect to each of the others and the article possessing the features, properties, and the relation of elements exemplified in the following detailed disclosure.

DETAILED DESCRIPTION OF THE INVENTION

The golf balls of the invention have a cover layer with properties comparable to those of covers made from hard-soft ionomer blends such as are disclosed in U.S. Pat. No. 4,884,814. It is surprising that the properties of ionomer blends can be achieved when two dissimilar materials, namely ionomeric copolymer and ethylene-propylene rubber, are combined. The combination of the invention also surprisingly has been found to yield superior results as compared to ionomer-rubber blends including ionomer blended with a styrene-isobutylene copolymer, such as Bromo XP-50 (Exxon Chemical Co.), and ionomer blended with a maleic anhydride-functionalized triblock copolymer consisting of polystyrene end blocks and poly(ethylene/butylene), such as Kraton FG-1901X (Shell Chemical Co.).

As indicated above, the golf ball cover compositions of the invention include ionomeric copolymer, ethylene-propylene rubber, and a copolymer of an olefin, an acrylate ester, and an acid. As used herein, the term "copolymer" includes (1) copolymers having two types of monomers which are polymerized together, (2) terpolymers (which are formed by the polymerization of three types of monomers), and (3) copolymers which are formed by the polymerization of more than three types of monomers. The ionomeric copolymer which is used according to the invention preferably, but not necessarily, is a copolymer having two types of monomers which are polymerized together. The two types of monomers preferably are ethylene and acrylic acid or methacrylic acid. The copolymer of an olefin, an acrylate ester and an acid according to the preferred embodiment of the invention is a terpolymer. As used herein, "acrylate ester" includes acrylate esters, methacrylate esters, and acrylate esters of longer chain length. Suitable and preferred ionomeric copolymers and terpolymers are described in further detail below.

The ethylene-propylene rubber which is used in the cover composition of the invention preferably includes ethylidene norbornene, 1,4 hexadiene or dicyclopentadiene as a termonomer. The ethylene-propylene rubber preferably has a melt index of 0.7 g/min (ASTM-1238-E) or less and an ethylene content of at least 65 wt %. The ethylene-propylene rubber preferably is not modified by maleic anhydride or another polar group. Particularly preferred types of EPDM for use in accordance with the invention are oil-extended EPDM materials such as Exxelor® PA-23, which is a proprietary Exxon blend of EPDM (VISTALON® 3708), ethylene vinyl acetate with >24 wt % vinyl acetate, and oil. Oil-extended EPDM commonly has a paraffinic oil added thereto in an amount of 25 to 100 parts per hundred parts of EPDM in order to improve processing, mixing, and plasticization, and to reduce cost. The physical properties of VISTALON® 3708, which is believed to contain ethylidene norbornene termonomer, are shown below on Table 1:

TABLE 1

Vistalon 3708
Ethylene-Propylene Terpolymer (EPDM)

| Property | Specification | Test Method[6] |
|---|---|---|
| Mooney Viscosity ML 1 + 4 at 125° C. | 52 ± 5 | ASTM D-1646[1], modified |
| Ash, Wt. % | 0.3 max. | Note 2 |
| Vanadium, wppm | 25 max. | Exxon test method |
| Water content, Wt. % | 0.5 max. | Note 3 |
| Cure Characteristics[4] | | ASTM D-2084[5], modified |
| Max. Torque ($M_H$), lbf · in | 39 ± 6 | |
| Min. Torque ($M_L$), lbf · in | 6 ± 3 | |
| Scorch (ts2), min. | 3.5 ± 1.5 | |
| 90% Cure Time (t'90), min | 16 ± 3 | |

[1]MV 2000 or equivalent. Radial cavity die.
[2]Correlated from content of known ash forming components, measured by Exxon test method.
[3]Correlated from water content at the finishing unit, measured by Exxon test method, incorporating the warehouse drying effect (verified annually).
[4]Cure Characteristics determined on ASTM D-3568-90, Formula 1, modified:

Formulation for VISTALON

| VISTALON 3708 | 100 | Stearic Acid | 1 |
|---|---|---|---|
| HAF black (IRB #6) | 80 | Sulfur | 1.5 |
| Oil (ASTM 103) | 50 | Tetramethylthiuram disulfide | 1.0 |
| Zinc oxide | 5 | 2-Mercaptobenzothiazole | 0.5 |

TABLE 1-continued

[5]Rheometer 100, micro die and rotor, no preheat, 4 min. temperature recovery, temp. 160° C., frequency 100 cpm, ± degree arc, chart time motor speed 30 min.
[6]All ASTM methods shown may be modified by the Exxon laboratory.

Vistalon 3708 Pellets
Ethylene-Propylene Terpolymer (EPDM)

| Property | Specification | Test Method[6] |
|---|---|---|
| Mooney Viscosity ML 1 + 4 at 125° C. | 49 ± 7 | ASTM D-1646[1], modified |
| Ash, Wt. % | 0.3 max. | Note 2 |
| Vanadium, wppm | 25 max. | ASTM D-1925, modified |
| Volatiles, Wt. % | 0.3 max. | Exxon test method |
| Color, Yellowness Index | 20 max. | ASTM D-1925, modified |
| Pellet Weight, g/30 pellets | 0.6 ± 0.2 | Scale |

[1]MV 2000 or equivalent. Radial cavity die.
[2]By correlation from content of known ash forming components, measured by Exxon test method.
[3]All ASTM methods shown may be modified by the Exxon laboratory.

VISTALON® 3708 is described by Exxon as a terpolymer which contains 65 wt % ethylene, has a Mooney viscosity of 54 ml 1+4 at 125° C., and has a broad molecular weight distribution. Other particularly preferred VISTALON® materials include VISTALON® 7000 terpolymer, which is believed to contain ethylidene norbornene termonomer, has a typical ethylene content of 70 wt %, a typical Mooney viscosity of 60 ML 1+4 @ 125° C., and a narrow molecular weight distribution; VISTALON® 808, which is an ethylene-propylene copolymer with two types of monomers and has a typical ethylene content of 75 wt %, a typical Mooney viscosity of 46 ML 1+4 @ 125° C. and a medium molecular weight distribution; and VISTALON® 878, which is an ethylene-propylene copolymer with two types of monomers and has a typical ethylene content of 54 wt %, a typical Mooney viscosity of 52 ML 1+4 @ 125° C., and a narrow molecular weight distribution. As used herein, the term "broad molecular weight distribution" refers to a molecular weight distribution ($M_W/M_N$) of about 4.0 or above. The term "medium molecular weight distribution" refers to a molecular weight distribution of about 2.5–4.0. A "narrow molecular weight distribution" is a molecular weight distribution of about less than 2.5. An EPDM with a broad molecular weight distribution has good elasticity properties, which translate into softness and good feel. EPDMs with a high ethylene content generally are preferred over those with a lower ethylene content.

The copolymer of olefin, acrylate ester, and acid preferably is preblended with the ethylene-propylene rubber before the ionomer resin is added. This copolymer is of a type which functions as a compatibilizing agent for the ethylene-propylene rubber and ionomeric copolymer. The acid groups of the compatibilizing agent preferably are no more than 50% neutralized, more preferably no more than 20% neutralized, and even more preferably are substantially unneutralized (no more than 5% neutralized with metal ions). In the most preferred form of the invention, the compatibilizing agent is completely unneutralized. The olefin preferably is ethylene. A particularly preferred unneutralized terpolymer for use as a compatibilizing agent constitutes ethylene-methylacrylate-acrylic acid. Such a terpolymer is available from EXXON Chemical Corp. under the trade name of ESCOR® ATX-320. The physical properties of ESCOR® ATX-320 and non-limiting examples of other suitable unneutralized terpolymers are shown below on Table 2:

TABLE 2

ESCOR ® Acid Terpolymers

| Resin Properties | ASTM Method | Units (SI) | ATX-310 | ATX-320 | ATX-325 |
|---|---|---|---|---|---|
| Melt Index | Exxon Method | g/10 min. | 6.9 | 5.0 | 20 |
| Density | Exxon Method | g/cm$^3$ | 0.941 | 0.950 | 0.950 |
| Acid Number | Exxon Method | mg KOH/g polymer | 45 | 45 | 45 |
| Melting Point | Exxon Method | °F. (°C.) | 192 (89) | 157 (69) | 152 (67) |
| Crystallization Temperature | Exxon Method | °F. (°C.) | 161 (71) | 124 (51) | 122 (50) |
| Physical Properties | | | | | |
| Young's Modulus | D-638 | psi (MPa) | 2700 (19) | 1300 (8.6) | 700 (4.9) |
| Flex Modulus | D-790 | psi (MPa) | 9700 (66) | 3700 (25) | 3166 (21) |
| Vicat Softening Point 200 g | D-1525 | °F. (°C.) | 187 (86) | 150 (66) | 141 (60) |
| Tensile Strength | | | | | |
| @ yield | D-638 | psi (MPa) | 480 (3.3) | 1800 (12) | 1100 (7.8) |
| @ break | | | 2100 (14) | 1800 (12) | 1100 (7.8) |
| Elongation | D-638 | % | >800 | >800 | >800 |
| @ break | | | | | |
| Tensile Impact | | | | | |
| @ 23° C. | D-1822 | ft · lb/in$^2$ (kJ/m$^2$) | 250 (530) | 360 (760) | 280 (590) |
| @ −40° C. | | | 140 (300) | 260 (550) | 190 (400) |
| Hardness | | | | | |
| Shore A | D-2240 | — | 90 | 83 | 80 |
| Shore D | | | 41 | 34 | 30 |

Furthermore, compatibilizing copolymers formed from α-olefin, acrylate ester, acid and one or more additional types of monomers also are expected to be useful in this invention.

The ionomer or blend of ionomers which is added to the cover composition generally is a copolymer containing two types of monomers, namely α-olefin and carboxylic acid, or a blend of copolymers each containing two types of monomers. The ionomer or blend of ionomers preferably has a Shore D hardness in the range of 40–70. The monomers generally have 10–95% of their acid groups neutralized with metal ions. Particularly preferred ionomers include those which are shown on Table 3 below:

TABLE 3

Iotek Ionomers

| Properties | ASTM Method | Units | IOTEK 7010 | IOTEK 7020 | IOTEK 7030 | IOTEK 8000 | IOTEK 8020 | IOTEK 8030 |
|---|---|---|---|---|---|---|---|---|
| General | | | | | | | | |
| Cation | | | Zn | Zn | Zn | Na | Na | Na |
| Melt Index | D-1238(E) | g/10 min. | 0.8 | 1.5 | 2.5 | 0.8 | 1.6 | 2.8 |
| Density | D-1505 | g/cc | 0.97 | 0.97 | 0.96 | 0.96 | 0.96 | 0.96 |
| Melting point | D-3417 | °F. | 182 | 183 | 185 | 181 | 183 | 189 |
| | | °C. | 84 | 84 | 84 | 83 | 84 | 87 |
| Vicat Softening Point (200 g) | D-1525 (Rate B) | °F. °C. | 140 60 | 140 60 | 140 60 | 129 54 | 130 55 | 132 56 |
| Toughness | | | | | | | | |
| Tensile Impact | | | | | | | | |
| @ 73° F. | D-1822 | ft-lb/in$^2$ | 260 | 250 | 230 | 270 | 260 | 240 |
| @ 23° C. | | kJ/m$^2$ | 550 | 520 | 480 | 570 | 550 | 500 |
| Tensile Impact | | | | | | | | |
| @ −40° F. | D-1822 | ft-lb/in$^2$ | 200 | 180 | 160 | 190 | 185 | 170 |
| @ −40° C. | | kJ/m$^2$ | 420 | 380 | 340 | 400 | 390 | 360 |
| Mechanical | | | | | | | | |
| Tensile Strength[1] | D-638 | psi | 3600 | 3400 | 3300 | 4800 | 4700 | 4700 |
| | | MPa | 25 | 23 | 23 | 33 | 32 | 32 |
| Elongation[1] | D-638 | % | 440 | 450 | 460 | 370 | 380 | 410 |
| Flex Resistance (De Mattia) | D-430 | Cycles | >5000 | >5000 | >5000 | >1000 | >1000 | >1000 |
| Flex Modulus | D-790 | kpsi | 28 | 25 | 23 | 46 | 49 | 52 |
| | | MPa | 190 | 175 | 155 | 320 | 340 | 355 |
| Hardness, Shore D | D-2240 | — | 54 | 53 | 52 | 60 | 60 | 60 |
| Abrasion Resistance (Volume Loss) | D-1242 | mm$^2$ | 16 | 18 | 25 | 15 | 17 | 27 |

[1]Type IV dumbell, 0.078 in (2 mm) thick compression molded plaques; test speed 20 in/min (50.8 cm/min)

The golf ball cover layer may further include at least one of additives, fillers, optical brighteners and coloring agents.

The golf ball of the invention has a COR of at least 0.725, more preferably at least 0.750, and most preferably at least 0.775. The cover layer, which preferably is the outer cover layer but also can be an inner cover layer of a multi-layer ball, has a Shore C hardness of 65–95, more preferably 75–95, and most preferably 80–90.

The golf ball cover layer of the invention preferably is made according to the following method. First, the ethylene-propylene rubber and compatibilizing copolymer of olefin, acrylate ester and acid are mixed in an internal mixer (Banbury®-type), extruder, two roll mill or other intensive mixing device in a weight ratio of 25/75 to 75/25. By preblending the ethylene-propylene rubber and compatibilizing copolymer, a more uniformly, intimately mixed blend is ultimately obtained. Subsequently, the blend of compatibilizing copolymer and ethylene-propylene rubber is mixed under the same conditions with ionomeric resin such that the combined mixture contains at least 10 wt % ionomeric resin. Any further additives, coagents, coloring agents or optical brighteners can either be mixed with the ionomer, mixed with the blend of compatibilizing copolymer and ethylene-propylene rubber, or added after the ionomer. The homogeneous blend is granulated and the cover material is then formed over a golf ball core in a conventional manner, such as by injection molding or compression molding. The core is of any suitable type, and preferably is a solid or wound core. Cores having one, two or more layers can be used. The golf ball can be finish coated using conventional techniques. Typically, finishing includes the application of a substantially clear top coat of polyurethane or the like with the optional use of an underlying substantially clear polyurethane primer coat.

The playability of the golf balls having the cover composition of the invention can be determined by measuring the coefficient of restitution (COR), compression, Shore hardness and cut resistance of the resulting golf ball, as well as the spin rate.

COR, along with additional factors such as club head speed, club head mass, ball weight, ball size and density, spin rate, angle of trajectory and surface configuration (i.e., dimple pattern and area of dimple coverage) as well as environmental conditions (e.g. temperature, moisture, atmospheric pressure, wind, etc.) generally determine the distance a ball will travel when hit. Along this line, the distance a golf ball will travel under controlled environmental conditions is a function of the speed and mass of the club and size, density and resilience (COR) of the ball and other factors. The initial velocity of the club, the mass of the club and the angle of the ball's departure are essentially provided by the golfer upon striking. Since club head speed, club head mass, the angle of trajectory and environmental conditions are not determinants controllable by golf ball producers and the ball size and weight are set by the U.S.G.A., these are not factors of concern among golf ball manufacturers. The factors or determinants of interest with respect to improved distance are generally the coefficient of restitution (COR) and the surface configuration (dimple pattern, ratio of land area to dimple area, etc.) of the ball.

The COR in solid core balls is a function of the composition of the molded core and of the cover. The molded core and/or cover may be comprised of one or more layers such as in multi-layered balls. In balls containing a wound core (i.e., balls comprising a liquid or solid center, elastic windings, and a cover), the coefficient of restitution is a function of not only the composition of the center and cover, but also the composition and tension of the elastomeric windings. As in the solid core balls, the center and cover of a wound core ball may also consist of one or more layers.

The coefficient of restitution is the ratio of the outgoing velocity to the incoming velocity. In the examples of this application, the coefficient of restitution of a golf ball was measured by propelling a ball horizontally at a speed of 125±5 feet per second (fps) and corrected to 125 fps against a generally vertical, hard, flat steel plate and measuring the ball's incoming and outgoing velocity electronically. Speeds were measured with a pair of Oehler Mark 55 ballistic screens available from Oehler Research, Inc., P.O. Box 9135, Austin, Tex. 78766, which provide a timing pulse when an object passes through them. The screens were separated by 36" and are located 25.25" and 61.25" from the rebound wall. The ball speed was measured by timing the pulses from screen 1 to screen 2 on the way into the rebound wall (as the average speed of the ball over 36"), and then the exit speed was timed from screen 2 to screen 1 over the same distance. The rebound wall was tilted 2 degrees from a vertical plane to allow the ball to rebound slightly downward in order to miss the edge of the cannon that fired it. The rebound wall is solid steel 2.0 inches thick.

As indicated above, the incoming speed should be 125±5 fps but corrected to 125 fps. The correlation between COR and forward or incoming speed has been studied and a correction has been made over the ±5 fps range so that the COR is reported as if the ball had an incoming speed of exactly 125.0 fps.

The coefficient of restitution must be carefully controlled in all commercial golf balls if the ball is to be within the specifications regulated by the United States Golf Association (U.S.G.A.). As mentioned to some degree above, the U.S.G.A. standards indicate that a "regulation" ball cannot have an initial velocity exceeding 255 feet per second in an atmosphere of 75° F. when tested on a U.S.G.A. machine.

Since the coefficient of restitution of a ball is related to the ball's initial velocity, it is highly desirable to produce a ball having sufficiently high coefficient of restitution to closely approach the U.S.G.A. limit on initial velocity, while having an ample degree of softness (i.e., hardness) to produce enhanced playability (i.e., spin, etc.).

PGA compression is another important property involved in the performance of a golf ball. The compression of the ball can affect the playability of the ball on striking and the sound or "click" produced. Similarly, compression can effect the "feel" of the ball (i.e., hard or soft responsive feel), particularly in chipping and putting.

Moreover, while compression itself has little bearing on the distance performance of a ball, compression can affect the playability of the ball on striking. The degree of compression of a ball against the club face and the softness of the cover strongly influences the resultant spin rate. Typically, a softer cover will produce a higher spin rate than a harder cover. Additionally, a harder core will produce a higher spin rate than a softer core. This is because at impact a hard core serves to compress the cover of the ball against the face of the club to a much greater degree than a soft core thereby resulting in more "grab" of the ball on the clubface and subsequent higher spin rates. In effect the cover is squeezed between the relatively incompressible core and clubhead. When a softer core is used, the cover is under much less compressive stress than when a harder core is used and therefore does not contact the clubface as intimately. This results in lower spin rates.

The term "compression" utilized in the golf ball trade generally defines the overall deflection that a golf ball undergoes when subjected to a compressive load. For example, PGA compression indicates the amount of change in golf ball's shape upon striking. The development of solid core technology in two-piece balls has allowed for much more precise control of compression in comparison to thread wound three-piece balls. This is because in the manufacture of solid core balls, the amount of deflection or deformation is precisely controlled by the chemical formula used in making the cores. This differs from wound three-piece balls wherein compression is controlled in part by the winding process of the elastic thread. Thus, two-piece and multilayer solid core balls exhibit much more consistent compression readings than balls having wound cores such as the thread wound three-piece balls.

In the past, PGA compression related to a scale of from 0 to 200 given to a golf ball. The lower the PGA compression value, the softer the feel of the ball upon striking. In practice, tournament quality balls have compression ratings around 70–110, preferably around 80 to 100.

In determining PGA compression using the 0–200 scale, a standard force is applied to the external surface of the ball. A ball which exhibits no deflection (0.0 inches in deflection) is rated 200 and a ball which deflects 2/10th of an inch (0.2 inches) is rated 0. Every change of 0.001 of an inch in deflection represents a 1 point drop in compression. Consequently, a ball which deflects 0.1 inches (100×0.001 inches) has a PGA compression value of 100 (i.e., 200–100) and a ball which deflects 0.110 inches (110×0.001 inches) has a PGA compression of 90 (i.e., 200–110).

In order to assist in the determination of compression, several devices have been employed by the industry. For example, PGA compression is determined by an apparatus fashioned in the form of a small press with an upper and lower anvil. The upper anvil is at rest against a 200-pound die spring, and the lower anvil is movable through 0.300 inches by means of a crank mechanism. In its open position the gap between the anvils is 1.780 inches allowing a clearance of 0.100 inches for insertion of the ball. As the lower anvil is raised by the crank, it compresses the ball against the upper anvil, such compression occurring during the last 0.200 inches of stroke of the lower anvil, the ball then loading the upper anvil which in turn loads the spring. The equilibrium point of the upper anvil is measured by a dial micrometer if the anvil is deflected by the ball more than 0.100 inches (less deflection is simply regarded as zero compression) and the reading on the micrometer dial is referred to as the compression of the ball. In practice, tournament quality balls have compression ratings around 80 to 100 which means that the upper anvil was deflected a total of 0.120 to 0.100 inches.

An example to determine PGA compression can be shown by utilizing a golf ball compression tester produced by Atti Engineering Corporation of Newark, N.J. The value obtained by this tester relates to an arbitrary value expressed by a number which may range from 0 to 100, although a value of 200 can be measured as indicated by two revolutions of the dial indicator on the apparatus. The value obtained defines the deflection that a golf ball undergoes when subjected to compressive loading. The Atti test apparatus consists of a lower movable platform and an upper movable spring-loaded anvil. The dial indicator is mounted such that it measures the upward movement of the spring-loaded anvil. The golf ball to be tested is placed in the lower platform, which is then raised a fixed distance. The upper portion of the golf ball comes in contact with and exerts a pressure on the springloaded anvil. Depending upon the distance of the golf ball to be compressed, the upper anvil is forced upward against the spring.

Alternative devices have also been employed to determine compression. For example, Applicant also utilizes a modified Riehle Compression Machine originally produced by Riehle Bros. Testing Machine Company, Phil., Pa. to evaluate compression of the various components (i.e., cores, mantle cover balls, finished balls, etc.) of the golf balls. The Riehle compression device determines deformation in thousandths of an inch under a fixed initialized load of 200 pounds. Using such a device, a Riehle compression of 61 corresponds to a deflection under load of 0.061 inches.

Additionally, an approximate relationship between Riehle compression and PGA compression exists for balls of the same size. It has been determined by Applicant that Riehle compression corresponds to PGA compression by the general formula PGA compression=160-Riehle compression. Consequently, 80 Riehle compression corresponds to 80 PGA compression, 70 Riehle compression corresponds to 90 PGA compression, and 60 Riehle compression corresponds to 100 PGA compression. For reporting purposes, Applicant's compression values are usually measured as Riehle compression and converted to PGA compression.

Furthermore, additional compression devices may also be utilized to monitor golf ball compression so long as the correlation to PGA compression is know. These devices have been designed, such as a Whitney Tester, to correlate or correspond to PGA compression through a set relationship or formula.

Shore C hardness was measured in general accordance to ASTM D-2240 except that measurements were made on the molded ball, rather than a flat surface. Furthermore, the Shore C hardness of the covers was measured while the cover remained over the core. When a hardness measurement was made on a dimpled cover, Shore C hardness was measured at a land area of the dimpled cover.

The golf balls of the invention preferably have a cut resistance of at least 3. Cut resistance was measured in accordance with the following procedure: A golf ball was fired at 135 feet per second against the leading edge of a pitching wedge wherein the leading edge radius is 1/32 inch, the loft angle is 51 degrees, the sole radius is 2.5 inches and the bounce angle is 7 degrees.

The cut resistance of the balls tested herein was evaluated on a scale of 1 to 5. The number 1 represents a cut that extends completely through the cover to the core. A 2 represents a cut that does not extend completely through the cover but that does break the surface. A 3 does not break the surface of the cover but does leave a permanent dent. A 4 leaves only a slight crease which is permanent but not as severe as 3. A 5 represents virtually no visible indentation or damage of any sort.

The spin rate of the golf ball was measured by striking the resulting golf balls with a 9 iron wherein the club-head speed is about 80 feet per second and the ball is launched at an angle of 26 to 34 degrees with an initial velocity of about 110–115 feet per second. The spin rate was measured by observing the rotation of the ball in flight using stop action Strobe photography. Initial velocity is the velocity of a golf ball when struck at a hammer speed of 143.8 feet per second in accordance with a test as prescribed by the U.S.G.A.

Having generally described the invention, the following examples are included for purposes of illustration so that the invention may be more readily understood and are in no way intended to limit the scope of the invention unless otherwise specifically indicated.

EXAMPLE 1

A number of golf ball cores having an average diameter of about 1.545 inches, a PGA compression of about 100 and a COR of about 80 were formed. A number of the cores were covered with cover formulations 1-1 through 1-5 which are shown on Table 4. Example 1-1 constitutes the golf ball of the invention. Examples 1-2 through 1-5 constitute control examples. In Example 1-1, Vistalon® 3708 and ESCOR® ATX-320 unneutralized terpolymer were combined in a 50—50 wt % ratio, 0.1 wt % Irganox™ 1010 antioxidant (Ciba-Geigy Corp.) was added, and the mixture was blended in a Banbury®-type internal mixer at about 200° F. for 15 minutes. The blend was mixed with Iotek 7030 in a Banbury®-type internal mixer for 15 minutes at a temperature of 200° F. Subsequently, Iotek 8000 was added and blending continued for five minutes at 200° F. The relative quantities of the EPDM-Terpolymer blend, Iotek 8000 and Iotek 7030 are shown on Table 4. The cover material was placed over the golf ball cores in a thickness of about 0.0675 inches, with the thickness being measured on a non-dimpled portion of the ball. The golf ball and cover exhibited the properties shown on Table 4.

TABLE 4-continued

| Composition | Example No. | | | | |
|---|---|---|---|---|---|
| (parts by wt.) | 1-1 | 1-2 | 1-3 | 1-4 | 1-5 |
| Cut Resistance | 4 | 4 | 4–5 | 3–4 | 4 |
| Weight (g) | 45.1 | 45.3 | 45.3 | 45.4 | 45.3 |
| PGA Compression | 102 | 104 | 107 | 99 | 102 |
| COR | .801 | .794 | .811 | .781 | .796 |
| Spin Rate (revs/min)[3] | 9,036 | 8,942 | 6,415 | 9,989 | 8,854 |

[1]Styrene-isobutylene copolymer (Exxon Chemical Co.)
[2]Maleic anhydride functionalized triblock copolymer consisting of polystyrene end blocks and poly(ethylene/butylene), i.e. styrene-ethylene-butylene-styrene block copolymer (Shell Chemical Co.)
[3]± about 100 revs/min

EXAMPLE 2

The procedure of Example 1 was repeated using a number of different blends of VISTALON® 3708, ESCOR ATX-320 and ionomer. The composition of the covers and the resulting properties of the golf balls are shown on Table 5.

TABLE 5

| Composition (parts by wt.) | 2-1 | 2-2 | 2-3 | 2-4 | 2-5 | 2-6 | 2-7 | 2-8[1] | 2-9[2] | 2-10[3] |
|---|---|---|---|---|---|---|---|---|---|---|
| Iotek 8000 | 40 | 30 | 20 | 10 | 25 | 50 | 25 | | | |
| Iotek 7030 | 40 | 30 | 20 | 10 | 25 | 50 | 25 | | | |
| Iotek 7520 | — | — | — | — | — | — | 50 | | | |
| EPDM - Terpolymer Blend | 20 | 40 | 60 | 80 | 50 | — | — | | | |
| Weight (g) | 45.0 | 44.8 | 44.7 | 44.8 | 44.7 | 45.0 | 44.9 | 45.2 | 45.2 | 45.3 |
| PGA Compression | 104 | 102 | 99 | 97 | 101 | 107 | 100 | 92 | 102 | 103 |
| COR | .804 | .795 | .786 | .782 | .789 | .810 | .785 | .779 | .802 | .806 |
| Shore C hardness | 92 | 87 | 78 | 67 | 81 | 96 | 84 | 82 | 84 | 87 |
| Cut Resistance | 3–4 | 3–4 | 3 | 2–3 | 3–4 | 4–5 | 3 | 1–2 | 3 | 3–4 |
| Spin Rate (RPM) | 8,719 | 9,938 | 10,721 | 11,012 | 10,454 | 7,591 | 10,188 | 9,632 | 10,151 | 9,942 |

[1]Titleist Tour 100 (1993)
[2]Top-Flite Tour Edition 100 (1993)
[3]Top-Flite Tour Edition 90 (1993)

In Examples 1-2 through 1-5, the EPDM-Terpolymer blend was replaced by various other materials, such as ionomer and styrene copolymers. The same blending conditions were used as for Example 1-1 and the covers had the same thickness as the EPDM-containing covers. The resulting properties of the golf balls are also provided on Table 4.

As shown on Table 4, the golf ball having a cover formed according to the invention had a high COR and a soft Shore C hardness. The only golf ball with a higher COR (Example 1-3) had a Shore C hardness that was 12 points harder than that of the ball of the invention. The other control balls had inferior CORs as compared to the ball of the invention. Thus, for a golf ball having a relatively soft cover of, e.g. 75–90 Shore C, the golf ball cover of the invention produces a superior result as compared to the other ionomer-rubber blends which were used.

TABLE 4

| Composition | Example No. | | | | |
|---|---|---|---|---|---|
| (parts by wt.) | 1-1 | 1-2 | 1-3 | 1-4 | 1-5 |
| Iotek 8000 | 33 | 33 | 50 | 33 | 33 |
| Iotek 7030 | 33 | 33 | 50 | 33 | 33 |
| Iotek 7520 | — | — | — | — | 34 |
| Bromo XP-50[1] | — | 34 | — | — | — |
| EPDM-Terpolymer blend | 34 | — | — | — | — |
| Kraton FG-1901X[2] | — | — | — | 34 | — |
| Shore C Hardness | 84 | 86 | 96 | 83 | 88 |

As shown on Table 5, the Shore C hardness of the covers all decreased as the amount of nonionomeric material was increased, and spin rate generally increased with decreasing hardness. A high spin rate is desirable for a more skilled golfer for increased control.

EXAMPLE 3

A proprietary Exxon blend of VISTALON® 3708, ethylene vinyl acetate with a vinyl acetate content >24 wt %, and oil, known as EXXELOR® PA-23 was melt blended with ESCOR® ATX 320 to form Modified PA-23. The Modified PA-23 was blended with Iotek 8000 in various weight percentages. The physical properties of the blends are shown on Table 6.

As indicated by the data on Table 6, blends of Modified PA-23 and ionomer are high elongation, flexible, tough (high impact strength) compositions that are useful in relatively soft-covered golf balls as an alternative to hard/soft ionomer blends.

TABLE 6

| COMPOSITION (parts by wt.) | 3-1 | 3-2 | 3-3 | 3-4 |
|---|---|---|---|---|
| Iotek 8000 | 100 | 90 | 80 | 70 |
| Modified PA-23 | — | 10 | 20 | 30 |
| PHYSICAL | | | | |

TABLE 6-continued

| COMPOSITION (parts by wt.) | 3-1 | 3-2 | 3-3 | 3-4 |
|---|---|---|---|---|
| PROPERTIES | | | | |
| Spiral Flow, CM @ 1100 PSI | 14.2 | 13.8 | 13.4 | 13.0 |
| 1/8" Notched Izod Impact, ft-lb/in | 7.6 | 9.7 | 8.8 | 6.4 |
| Flex Modulus (1%), psi | 76,000 | 58,000 | 46,000 | — |
| Shore Hardness | | | | |
| Initial Reading | 59.7 | 56.0 | 49.3 | 47.2 |
| Reading after 15 sec. | 56.8 | 51.9 | 45.0 | 43.4 |
| Vicat Softening Temp. °C. | 53.7 | 52.0 | 49.9 | 49.7 |
| Tensile Strength @ Yield, psi | 2509 | 2500 | 2100 | 1800 |
| Elongation @ Break, % | 245 | 690 | 590 | 550 |

As will be apparent to persons skilled in the art, various modifications and adaptations of the structure above described will become readily apparent without departure from the spirit and scope of the invention, the scope of which is defined in the appended claims.

What is claimed is:

1. A golf ball having a cover layer with a composition comprising a combination of (1) ionomeric copolymer, (2) ethylene-propylene rubber, and (3) copolymer formed from (a) an α-olefin having two to eight carbon atoms, (b) an unsaturated monomer of the acrylate ester class having from 1–21 carbon atoms, and (c) an acid which includes at least one member selected from the group consisting of α, β-ethylenically unsaturated mono- and dicarboxylic acids, the weight ratio of the ethylene-propylene rubber to copolymer formed from α-olefin, acrylate ester and acid being in the range of 25:75 to 75:25.

2. A golf ball according to claim 1, wherein the copolymer formed from α-olefin, unsaturated monomer and acid is substantially unneutralized.

3. A golf ball according to claim 2, wherein the combination includes at least 10 weight % ionomeric copolymer based upon the overall weight of the combination.

4. A golf ball according to claim 2, wherein the combination includes at least 20 weight % ionomeric copolymer based upon the overall weight of the combination.

5. A golf ball according to claim 2, wherein the combination includes at least 40 weight % ionomeric copolymer based upon the overall weight of the combination.

6. A golf ball according to claim 1, wherein the ethylene-propylene rubber comprises a polymer formed from ethylene propylene diene monomer.

7. A golf ball according to claim 2, wherein the ethylene-propylene rubber comprises a polymer formed from ethylene propylene diene monomer.

8. A golf ball according to claim 6, wherein the polymer formed from ethylene propylene diene monomer and copolymer formed from α-olefin, acrylate ester and acid are combined in a weight ratio in the range of 40:60 to 60:40.

9. A golf ball according to claim 7, wherein the polymer formed from ethylene propylene diene monomer and copolymer formed from α-olefin, acrylate ester and acid are combined in a weight ratio in the range of 40:60 to 60:40.

10. A golf ball according to claim 2, wherein the olefin is ethylene.

11. A golf ball according to claim 2, wherein the acid is at least one member selected from the group consisting of acrylic, maleic, itaconic, fumaric, and methacrylic acids, and half esters of maleic, fumaric, and itaconic acids.

12. A golf ball according to claim 2, wherein the unsaturated monomer of the acrylate ester class is at least one member selected from the group consisting of methyl-, ethyl-, n-propyl-, n-butyl-, n-octyl-, 2-ethylhexyl-, and 2-methoxyethyl-1-acrylates.

13. A golf ball according to claim 6, wherein the polymer formed from ethylene propylene diene monomer has a melt index of 0.7 g/min (ASTM-1238-E) or less and an ethylene content of at least 65 wt %.

14. A golf ball according to claim 6, wherein the polymer formed from ethylene propylene diene monomer is an oil-extended copolymer having a broad molecular weight distribution.

15. A golf ball according to claim 6, wherein the copolymer formed from α-olefin, acrylate ester and acid is substantially unneutralized.

16. A golf ball according to claim 6, wherein the cover layer has a Shore C hardness of 65–95.

17. A golf ball according to claim 6, wherein the cover layer has a Shore C hardness of 75–95.

18. A golf ball according to claim 6, wherein the cover layer has a cut resistance of at least 3.

19. A golf ball according to claim 6, wherein the cover layer further includes at least one of additives, fillers, optical brighteners and coloring agents.

20. A golf ball according to claim 6, wherein the combination constitutes at least 85% wt of the composition.

21. A golf ball according to claim 6, wherein the polymer formed from ethylene propylene diene monomer has a broad molecular weight distribution.

22. A golf ball having a cover layer with a composition comprising a combination of (1) ionomeric copolymer, (2) ethylene-propylene rubber, and (3) substantially unneutralized terpolymer, the terpolymer being formed from ethylene, an acid which includes at least one member selected from the group consisting of acrylic, maleic, itaconic, fumaric, and methacrylic acids, and half esters of maleic, fumaric, and itaconic acids, and an unsaturated monomer of the acrylate ester class including at least one member selected from the group consisting of methyl-, ethyl-, n-propyl-, n-butyl-, n-octyl-, 2-ethylhexyl-, and 2-methoxyethyl-1-acrylates, the ethylene-propylene rubber and terpolymer being combined in a weight ratio of 40:60 to 60:40, the ratio of the sum of the weights of ethylene-propylene rubber and terpolymer to the weight of ionomeric copolymer in the combination being in the range of 20:80 to 80:20.

23. A golf ball according to claim 22, wherein the cover layer has a Shore C hardness of 65–95.

24. A golf ball according to claim 23, wherein the cover layer has a cut resistance of at least 3.

25. A method of making a golf ball comprising:
    providing a golf ball core, and
    forming a cover layer over the core, the cover layer having a composition comprising a combination of (1) ionomeric copolymer, (2) ethylene-propylene rubber, and (3) substantially unneutralized copolymer formed from (a) an α-olefin having two to eight carbon atoms, (b) an unsaturated monomer of the acrylate ester class having from 1–21 carbon atoms, and (c) an acid which includes at least one member selected from the group consisting of α, β-ethylenically unsaturated mono- or dicarboxylic acids, the weight ratio of the ethylene-propylene rubber to substantially unneutralized copolymer being in the range of 25:75,to 75:25.

26. A method according to claim 25, wherein the ethylene-propylene rubber and substantially unneutralized copolymer are pre-mixed with each other prior to being combined with the ionomeric copolymer.

27. A golf ball having a cover layer with a composition comprising a combination of (1) ionomeric copolymer, (2) ethylene-propylene rubber having a broad molecular weight distribution, and (3) substantially unneutralized copolymer formed from (a) an α-olefin having two to eight carbon atoms, (b) an unsaturated monomer of the acrylate ester class having from 1–21 carbon atoms, and (c) an acid which includes at least one member selected from the group consisting of α, β-ethylenically unsaturated mono- and dicarboxylic acids, the weight ratio of the ethylene-propylene rubber to copolymer formed from α-olefin, acrylate ester and acid being in the range of 25:75 to 75:25.

28. A golf ball according to claim 27, wherein the copolymer formed from α-olefin, unsaturated monomer and acid is substantially unneutralized.

* * * * *